(12) United States Patent
Miller et al.

(10) Patent No.: US 12,491,880 B2
(45) Date of Patent: Dec. 9, 2025

(54) TRAILER REVERSE WITH AUTOMATED FREE-SPACE GUIDANCE

(71) Applicant: Robert Bosch GmbH, Stuttgart (DE)

(72) Inventors: James Stephen Miller, Dexter, MI (US); Paul Wickett, Northville, MI (US); Christopher Allensworth, Waterford, MI (US); Rohit Kumar Kesireddy, Ann Arbor, MI (US)

(73) Assignee: Robert Bosch GbmH, Stuttgart (DE)

( * ) Notice: Subject to any disclaimer, the term of this patent is extended or adjusted under 35 U.S.C. 154(b) by 599 days.

(21) Appl. No.: 18/046,763

(22) Filed: Oct. 14, 2022

(65) Prior Publication Data

US 2024/0123991 A1 Apr. 18, 2024

(51) Int. Cl.
*B60W 30/18* (2012.01)
*B60R 1/26* (2022.01)
(Continued)

(52) U.S. Cl.
CPC ........ *B60W 30/18036* (2013.01); *B60R 1/26* (2022.01); *B60T 8/17* (2013.01); *B60W 10/04* (2013.01); *B60W 10/18* (2013.01); *B60W 10/20* (2013.01); *B62D 15/025* (2013.01); *G06T 7/70* (2017.01); *G06V 20/58* (2022.01); *H04N 7/183* (2013.01); *B60W 2420/403* (2013.01); *B60W 2710/182* (2013.01); *B60W 2710/207* (2013.01);
(Continued)

(58) Field of Classification Search
CPC ........... B60W 30/18036; B60W 10/04; B60W 10/18; B60W 10/20; B60W 2420/403; B60W 2710/182; B60W 2710/207; B60W 2720/106; B60R 1/26; B60T 8/17; B62D 15/025; B62D 15/028; B62D 15/0285; B62D 13/06; G06T 7/70; G06T 2207/30241; G06T 2207/30261; G06T 2207/30252; G06T 7/73; G06V 20/58; H04N 7/183

See application file for complete search history.

(56) References Cited

U.S. PATENT DOCUMENTS 9,238,483 B2 1/2016 Hafner et al.
9,555,832 B2 1/2017 Smit et al.
(Continued)

OTHER PUBLICATIONS

International Search Report and Written Opinion for Application No. PCT/EP2023/077405 dated Feb. 2, 2024 (12 pages).

*Primary Examiner* — Lindsay M Low
*Assistant Examiner* — Charles J Brauch
(74) *Attorney, Agent, or Firm* — Michael Best & Friedrich LLP

(57) ABSTRACT

A trailer tow assist system including a camera that captures a rearward image of the trailer and its surroundings, a human machine interface that displays the rearward image, an input device that receives user input, and an electronic processor. The electronic processor receives the rearward image, identifies a target-space within the surroundings, determines a vehicle orientation relative to the target-space, determines a trailer angle relative to the vehicle, determines a trailer trajectory within the surroundings, and displays the trailer trajectory and rearward image on the human machine interface. The electronic processor also controls, in response to the user input, the vehicle to follow the trailer trajectory along a centerline of the trailer trajectory.

20 Claims, 11 Drawing Sheets

(51) Int. Cl.
  *B60T 8/17* (2006.01)
  *B60W 10/04* (2006.01)
  *B60W 10/18* (2012.01)
  *B60W 10/20* (2006.01)
  *B62D 15/02* (2006.01)
  *G06T 7/70* (2017.01)
  *G06V 20/58* (2022.01)
  *H04N 7/18* (2006.01)

(52) U.S. Cl.
  CPC ............... *B60W 2720/106* (2013.01); *G06T 2207/30241* (2013.01); *G06T 2207/30261* (2013.01)

(56) References Cited

U.S. PATENT DOCUMENTS

| | | |
|---|---|---|
| 9,558,409 B2 | 1/2017 | Pliefke et al. |
| 11,067,993 B2 | 7/2021 | Gali et al. |
| 11,279,403 B2 | 3/2022 | Critchley et al. |
| 2009/0189539 A1* | 7/2009 | Deng ............... H05B 45/46 315/294 |
| 2015/0203156 A1* | 7/2015 | Hafner ............... G08G 1/143 701/36 |
| 2015/0321697 A1 | 11/2015 | Lu et al. |
| 2016/0152263 A1 | 6/2016 | Singh et al. |
| 2021/0284240 A1 | 9/2021 | Goodarzi et al. |

\* cited by examiner

TRAILER REVERSE WITH AUTOMATED FREE-SPACE GUIDANCE

BACKGROUND

Embodiments, examples, and aspects relate to, among other things, a system and method for assisting in rearward maneuvering of a trailer attached to a vehicle.

SUMMARY

Some existing vehicles (for example, pickup trucks) include a trailer tow assist system. The inventors have learned that in some instances, it is difficult for an operator of the vehicle to tell whether the towed trailer is positioned correctly while backing up the trailer. In some instances, visual features provided by the tow assist system are not as helpful as desired. In other instances, it can be difficult for the operator of the vehicle to determine whether the starting position of the trailer is one from which the trailer may be maneuvered to a desired target position while backing up. Some trailer tow systems provide a visual trajectory of the trailer that only includes a view of the current position of the trailer. However, only providing a view of the current trailer position is not always sufficient to ensure that the trailer will end up in the desired position.

Examples described herein provide, among other things, a system and method for assisting in rearward maneuvering of a trailer attached to a vehicle.

One example provides a trailer tow assist system for assisting in rearward maneuvering of a trailer attached to a vehicle. The trailer tow assist system includes a camera that captures a rearward image of the trailer and its surroundings, a human machine interface that displays the rearward image, an input device that receives user input, and an electronic processor. The electronic processor receives the rearward image, identifies, based on the rearward image, a target-space within the surroundings, determines, based on the rearward image, a vehicle orientation relative to the target-space, determines, based on the rearward image, a trailer angle relative to the vehicle, determines, based on the trailer angle, a trailer trajectory within the surroundings, displays the trailer trajectory and rearward image on the human machine interface, and controls, in response to the user input, the vehicle to follow the trailer trajectory along a centerline of the trailer trajectory.

In some instances, the electronic processor determines an object within the target-space to avoid.

In some instances, the electronic processor determines a boundary based on the target-space.

In some instances, the trailer tow assist system also includes a steering angle sensor that senses a first angle of a steering wheel of the vehicle, and a steering control system. The electronic processor determines a second angle based on the trailer trajectory and the first angle and controls the steering control system to follow the trailer trajectory based on the second angle.

In some instances, the electronic processor controls the steering control system in a first mode.

In some instances, during the first mode, the electronic processor controls the steering control system to maintain the first angle throughout the trailer trajectory.

In some instances, the electronic processor controls the steering control system in a second mode.

In some instances, during the second mode, the electronic processor controls the steering control system to maintain the second angle throughout the trailer trajectory.

In some instances, the trailer tow assist system also includes a braking control system and a master cylinder pressure sensor that senses a first pressure differential of the braking control system. The electronic processor determines a second pressure differential based on the trailer trajectory and the first pressure differential, and control the braking control system to apply the second pressure differential.

In some instances, the trailer tow assist system also includes an acceleration control system and a vehicle speed sensor that senses a first speed of the vehicle. The electronic processor determines a second speed based on the trailer trajectory and the first speed, and controls the vehicle acceleration system based on the second speed.

Another example provides a method for assisting in rearward maneuvering of a trailer attached to a vehicle with a trailer tow assist system including an electronic processor. The method, implemented by the electronic controller, includes receiving, via a camera, a rearward image of the trailer and its surroundings, identifying, based on the rearward image, a target-space within the surroundings, determining, based on the rearward image, a vehicle orientation relative to the target-space, determining, based on the rearward image, a trailer angle relative to the vehicle, determining, based on the trailer angle, a trailer trajectory within the surroundings, and displaying the trailer trajectory and the rearward image on a human machine interface. The method also includes controlling, in response to a user input, the vehicle to follow the trailer trajectory along a centerline of the trailer trajectory.

Other features, aspects, and benefits of various examples will become apparent by consideration of the detailed description and accompanying drawings.

DETAILED DESCRIPTION

Figure 1:
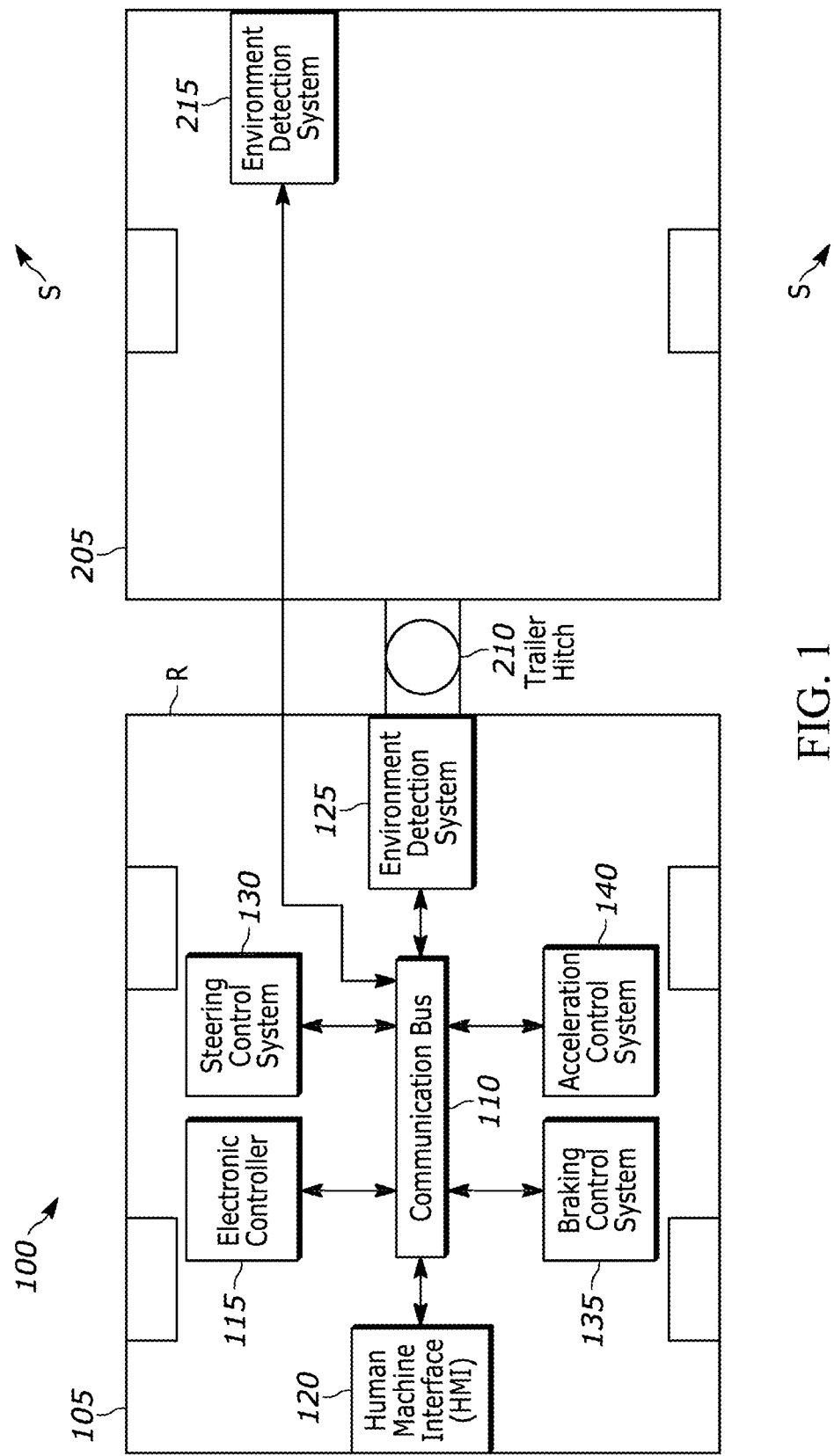
FIG. 1 is a block diagram of a trailer tow assist system for assisting in rearward maneuvering of a trailer attached to a vehicle according to one example.

One or more examples are described and illustrated in the following description and accompanying drawings. These examples are not limited to the specific details provided herein and may be modified in various ways. Other examples may exist that are not described herein. For example, a device or structure that is "configured" in a certain way is configured in at least that way but may also be configured in ways that are not listed.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the aspects may be implemented in software (for example, stored on non-transitory computer-readable medium) executable by one or more processors. Thus, a plurality of hardware and software based devices, as well as a plurality of different structural components may be utilized to implement various aspects and examples. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. Unless the context clearly indicates otherwise, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Examples described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections.

Unless the context of their usage unambiguously indicates otherwise, the articles "a" and "an" should not be interpreted as meaning "one" or "only one." Rather these articles should be interpreted as meaning "at least one" or "one or more.

Relational terms, for example, first and second, top and bottom, and the like may be used herein solely to distinguish one entity or action from another entity or action without necessarily requiring or implying any actual such relationship or order between such entities or actions.

In some examples, method steps are conducted in an order that is different from the order described.

FIG. 1 illustrates a system 100 for assisting in rearward maneuvering of a trailer attached to a vehicle (e.g., backing up a trailer). The examples disclosed herein relate to what is commonly referred to as a trailer tow assist (TTA) system. In the example illustrated, the system 100 includes a vehicle 105, a trailer 205, and a surroundings S of the vehicle 105 and the trailer 205. The vehicle 105 has a rear R. For example, the vehicle and trailer's surroundings S includes an area around the vehicle 105 and the trailer 205. The vehicle 105 is illustrated as a four-wheeled vehicle, but aspects, features, and embodiments described may be applied to other types and designs of wheeled vehicles. The trailer 205 although illustrated as a two-wheeled trailer, may encompass various types and designs of trailers.

In the example illustrated, the vehicle 105 includes several hardware components including a communication bus 110, an electronic controller 115, a human machine interface 120, an environment detection system 125, a steering control system 130, a braking control system 135, and an acceleration control system 140. These components are connected via communication bus 110 (for example, a FlexRay automotive communication bus, a controller area network (CAN) bus, or other type of bus). In the example illustrated, the trailer 205 includes at least one or more hardware components including an environment detection system 215. The environment detection system 215 is connected to the communication bus 110 of the vehicle 105.

The vehicle 105 and the trailer 205 are mechanically connected via a trailer hitch 210 that is mounted to the rear R of the vehicle 105. In some instances, the environment detection system 125 is configured to detect the presence of the trailer 110 or the connection of trailer 110 to vehicle 105. In some instances, the presence of the trailer 110 may be determined without using the environment detection system 125. For example, a weight sensor in the vehicle 105 may be used to provide information to determine or estimate the mass of the vehicle 105 and trailer 205. When the sensed weight or mass is greater than the known mass of the vehicle 105 (for example, as provided by the vehicle manufacturer), the system may assume that the vehicle 105 is hitched to the trailer 205 and, therefore, that the trailer 205 is present. In another example, multiple accelerometers in the vehicle 105 may be used to provide information to determine or estimate acceleration measurements of the vehicle 105 and the trailer 205. The acceleration measurements may be used to estimate applied forces (for example, braking forces, acceleration forces, steering forces, etc.) acting on the vehicle 105 and the trailer 205. The applied force estimates and acceleration measurements may be used to estimate the mass of the vehicle 105 and the trailer 205. Trailer presence may be detected in other ways, for example, trailer presence may be detected via the braking control system 135 by sensing a torque value that is indicative that the trailer 205 is connected to vehicle 105 (for example, the brake torque is greater than known brake torque values used to brake the vehicle 105 without the weight of the trailer 205).

Figure 2:
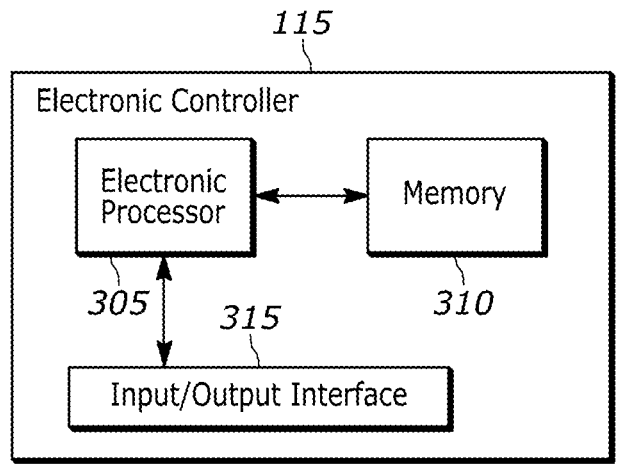
FIG. 2 is a block diagram of an electronic controller of the trailer tow assist system of FIG. 1 according to one example.

FIG. 2 is a block diagram of the electronic controller 115 of the system 100 of FIG. 1. The electronic controller 115 may include a plurality of electrical and electronic components that provide power, operation control, and protection to the components and modules within the electronic controller 115. The electronic controller 115 includes, among other things, an electronic processor 305 (such as a programmable electronic microprocessor, microcontroller, or similar device), a memory 310 (for example, a non-transitory, machine readable medium), and an input/output interface 315. The electronic processor 305 is communicatively connected to the memory 310 and the input/output interface 315. In some instances, the environment detection systems 125, 215 are communicatively connected to the electronic processor 305 via the input/output interface 315. In some examples, the electronic processor 305, in coordination with software stored in the memory 310 and information from the environment detection systems 125, 215, is configured to implement, among other things, the methods described herein.

Figure 3:
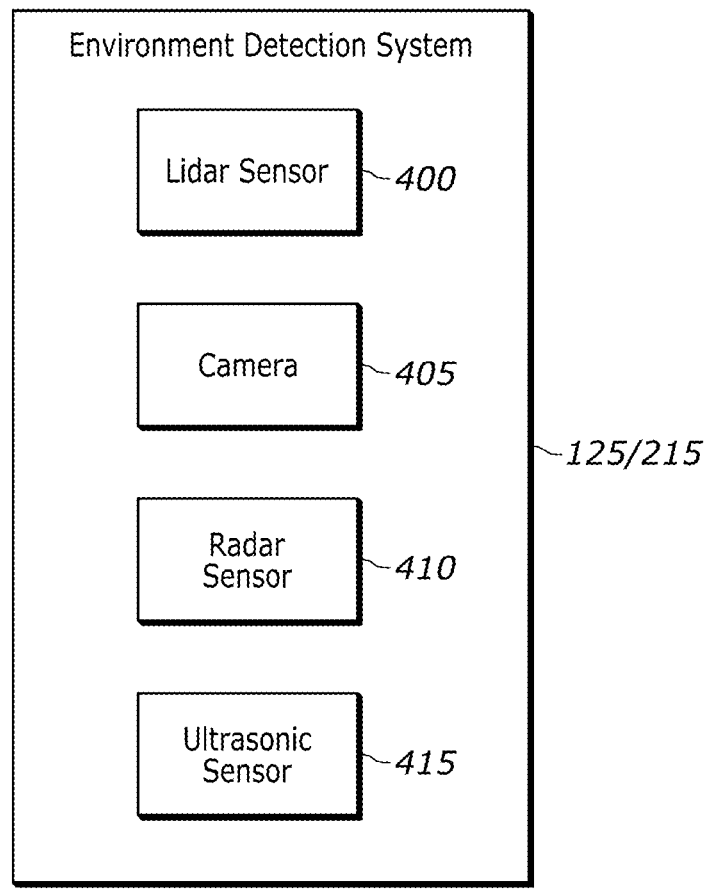
FIG. 3 is a block diagram of an environment detection system of the trailer tow assist system of FIG. 1 according to one example.

FIG. 3 is a block diagram illustrating possible configurations of the environment detection system 125 of the vehicle 105 and the environment detection system 215 of the trailer 205. Although illustrated as including identical components, the environmental detection system 215 can include more or fewer components than the environmental detection system 125. In the example shown in FIG. 3, the environment detection systems 125 and 215 include an image sensor, and three possible alternatives are shown: a lidar sensor 400, a camera 405, and a radar sensor 410. In some instances, the environment detection systems 125 and 215 may also include an ultrasonic sensor 415 in addition to one or more image sensor. In one example, the vehicle and trailer's surroundings S are detected using only the camera 405. In other examples, the environment detection systems 125 and 215 use additional sensors, the lidar sensor 400, radar sensor 410, or ultrasonic sensor 415, in combination with the camera 405 to detect the vehicle and trailer's surroundings S. In some examples, there are more than one of each of the sensors and they are located at different positions on the exterior of the vehicle 105 or the trailer 205. For example, the camera 405, or components thereof, is externally mounted to a portion of the vehicle 105 (such as on a side mirror or a trunk). In one example, the camera 405 is configured and/or positioned to capture images of the rear R of the vehicle 105 and the vehicle and trailer's surroundings S. The images can include the trailer 205 that is hitched to the vehicle 105 via the trailer hitch 210. The environment detection systems 125 and 215 provide the images over the communication bus 110 to the electronic controller 115.

Figure 4:
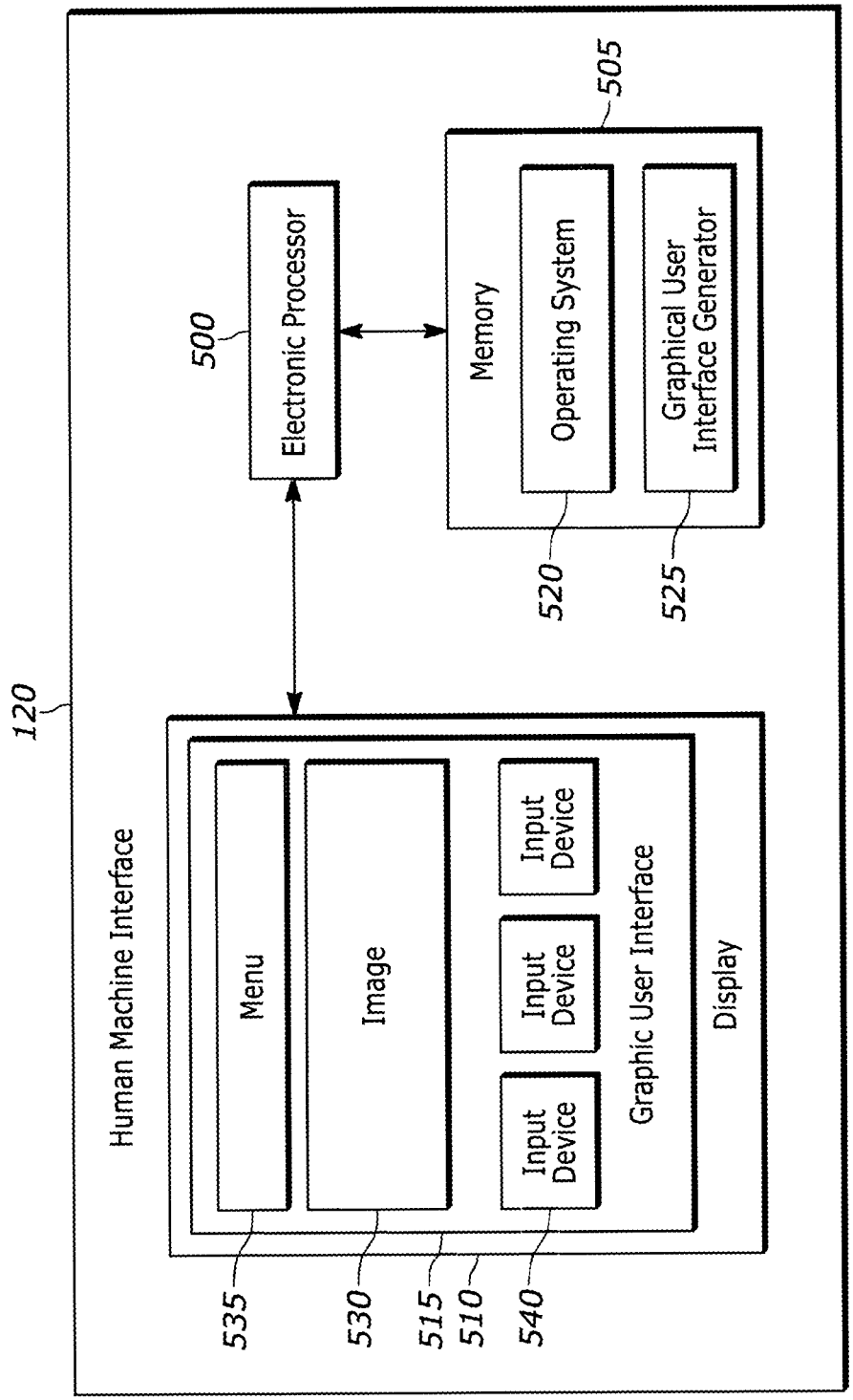
FIG. 4 is a block diagram of a human machine interface of the trailer tow assist system of FIG. 1 according to one example.

FIG. 4 is a block diagram illustrating the human machine interface 120 of FIG. 1. The human machine interface 120 may be one or more vehicle systems, for example, an infotainment system or may be standalone system as shown. In the example, provided human machine interface 120 includes, among other things, an electronic processor 500, a memory 505, and a display 510. The electronic processor 500 is communicatively connected to the memory 505 and the display 510. The memory 505 includes several software components for creating a graphical user interface 515 and processing user input, including an operating system 520 and a graphical user interface generator 525. The electronic processor 500, in coordination with the memory 505 and the display 510, is configured to generate the graphical user interface 515 and receive user input from the display 510. In the example illustrated in FIG. 4, one or more images 530 captured by the environment detection systems 125 and 215 are displayed within the graphical user interface 515. In some instances, the graphical user interface 515 is configured to display elements such as a menu 535 and input devices 540. In some examples, the input devices 540 are knobs configured to be rotated by a user. In other examples, the input devices 540 are virtual buttons configured to be actuated by the user. The user is able to input information into the display 510 in a variety of ways, such as selecting via a mouse or touching the image 530, the menu 535, or the input devices 540.

Figure 5:
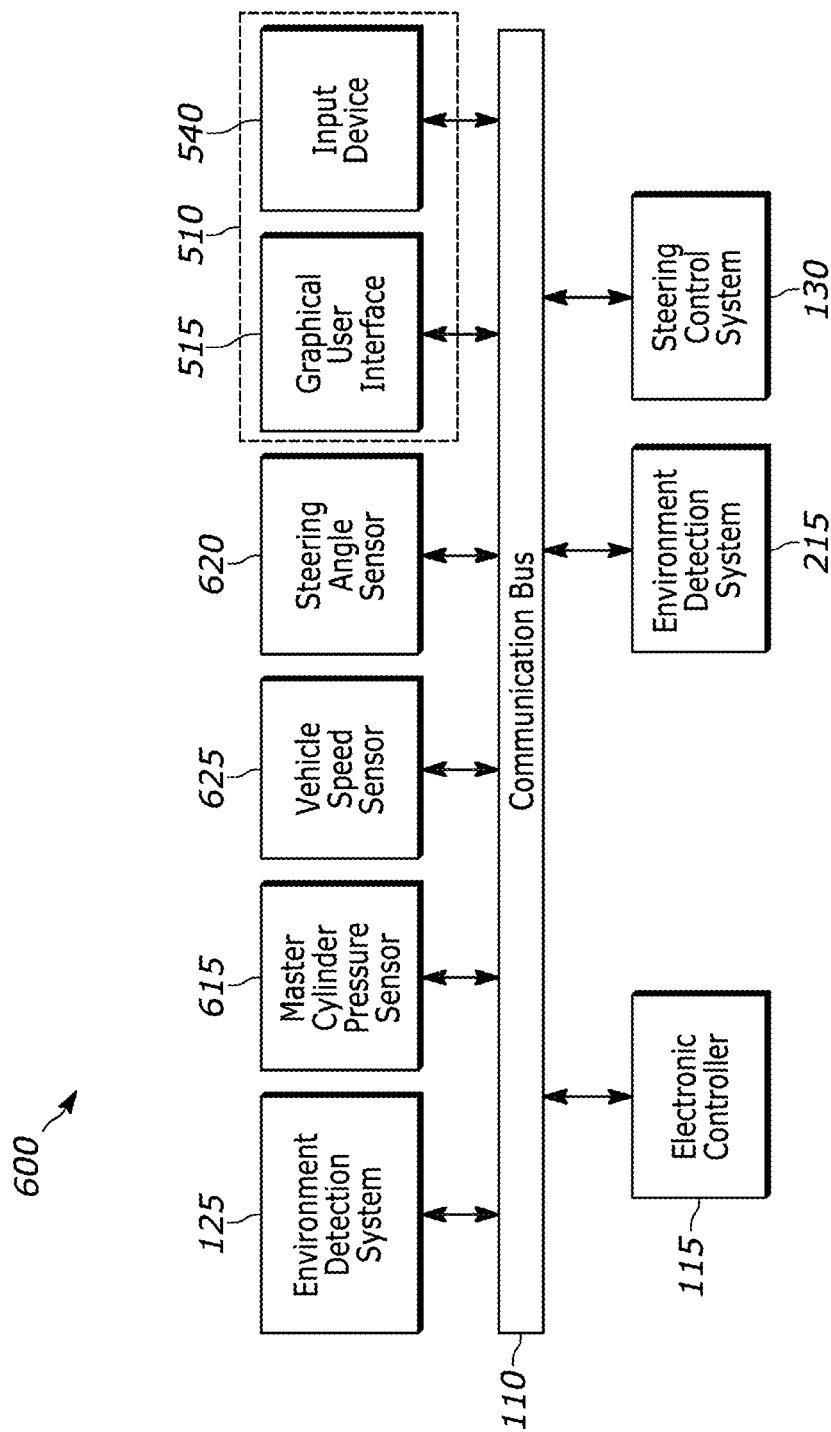
FIG. 5 is a block diagram of a trailer tow assist system for assisting in rearward maneuvering of a trailer that illustrates components located in the vehicle according to one example.

FIG. 5 illustrates a system 600 for assisting in rearward maneuvering of a trailer attached to a vehicle 105. In the example illustrated, the system 600 includes the communication bus 110, electronic controller 115, the environment detection systems 125 and 215, the steering control system 130, and the display 510. The components of the system 600 may be similar to, and be configured to operate similar to, any other system described herein (for example, the system 100).

As described above, the environment detection systems 125 and 215 are configured to capture images, via the camera 405, of the rear R of the vehicle 105 and the vehicle and trailer's surroundings S. The images can include the trailer 205 that is hitched to the vehicle 105 via the trailer hitch 210. The environment detection systems 125 and 215 provide the images over the communication bus 110 to the electronic processor 305. In one example, the electronic processor 305 is configured to perform an image analysis of the images, by executing one or more applications, to determine at least one or more characteristics of the vehicle and trailer's surroundings S. In some instances, the display 510 is configured to display the images and one or more characteristics of the vehicle and trailer's surroundings S based on the image analysis performed by the electronic processor 305.

In certain examples, the system 600 includes a number of additional sensors. In one instance the system 600 includes a master cylinder pressure sensor 615. The master cylinder pressure sensor 615 is, in one example, included within the braking control system 135. The master cylinder pressure sensor 615 senses a pressure differential of the vehicle braking system 135 and provides the sensed pressure differential over the communication bus 110 to the electronic processor 305. In some instances, the electronic processor 305 is configured to provide a braking command to the braking control system 135 based on the sensed pressure differential.

The system 600 also includes a steering angle sensor 620 to sense an input steering angle (for example, an angle of a steering wheel) or an actual angle of steered wheels of a vehicle. The steering angle sensor 620 provides the sensed steering angle over the communication bus 110 to the electronic processor 305. In another example, the steering angle sensor 620 is configured to sense rotation of a pinion gear secured to a steering shaft of the steering control system 130. In another example, the steering angle sensor 620 senses steering angle based on motor rotation of the power steering control motor and a ratio with respect to the rack and pinion gear. In some instances, the electronic processor 305 is configured to provide a steering command to the steering control system 130 based on the sensed angle.

In one example, the system 600 also includes a vehicle yaw rate sensor to sense an angular velocity (for example, an angular velocity about a vertical axis) of the vehicle 105. The vehicle yaw rate sensor is, in one example, included within the steering control system 130. The vehicle yaw rate sensor provides the sensed angular velocity over the communication bus 110 to the electronic processor 305. In some instances, the electronic processor 305 is configured to provide a steering command to the steering control system 130 based on the sensed angular velocity.

In one example, the system 600 also includes a vehicle speed sensor 625. The vehicle speed sensor 625 senses a vehicle speed and provides the sensed vehicle speed over the communication bus 110 to the electronic processor 305. In some instances, the vehicle speed sensor is included within the acceleration control system 140. In some instances, the electronic processor 305 is configured to provide an acceleration command to the acceleration control system 140 based on the sensed vehicle speed.

Figure 6:
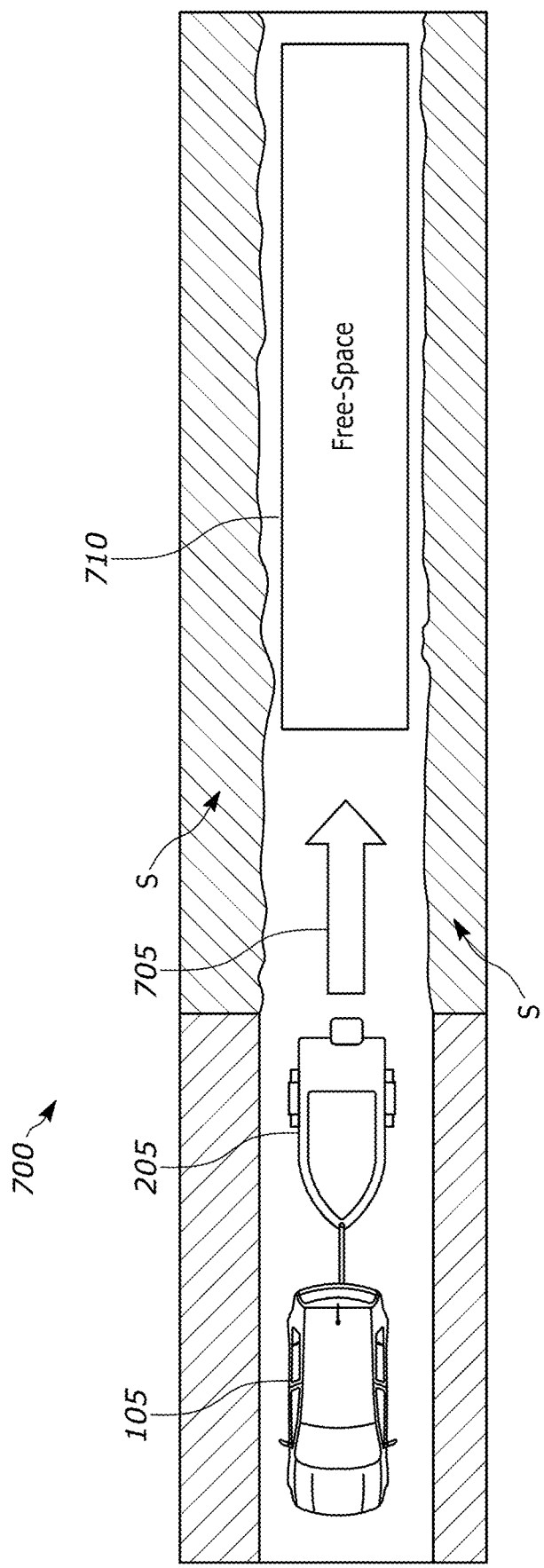
FIG. 6 illustrates a vehicle and a trailer where the vehicle backs the trailer into an area of free-space.

FIG. 6 illustrates a system 700 including the vehicle 105 attached to the trailer 205. In the illustrated example, the vehicle 105 backs up the trailer 205 in a direction 705 toward a free-space 710 (e.g., a target-space, drivable area, etc.). The target-space 710 is an area within the surroundings S of the trailer 205. For example, the target-space 710 is a road, a lane, a driveway, a boat ramp, or any other area where the system 700 can back up the trailer 205 while maintaining the direction 705.

Figure 7:
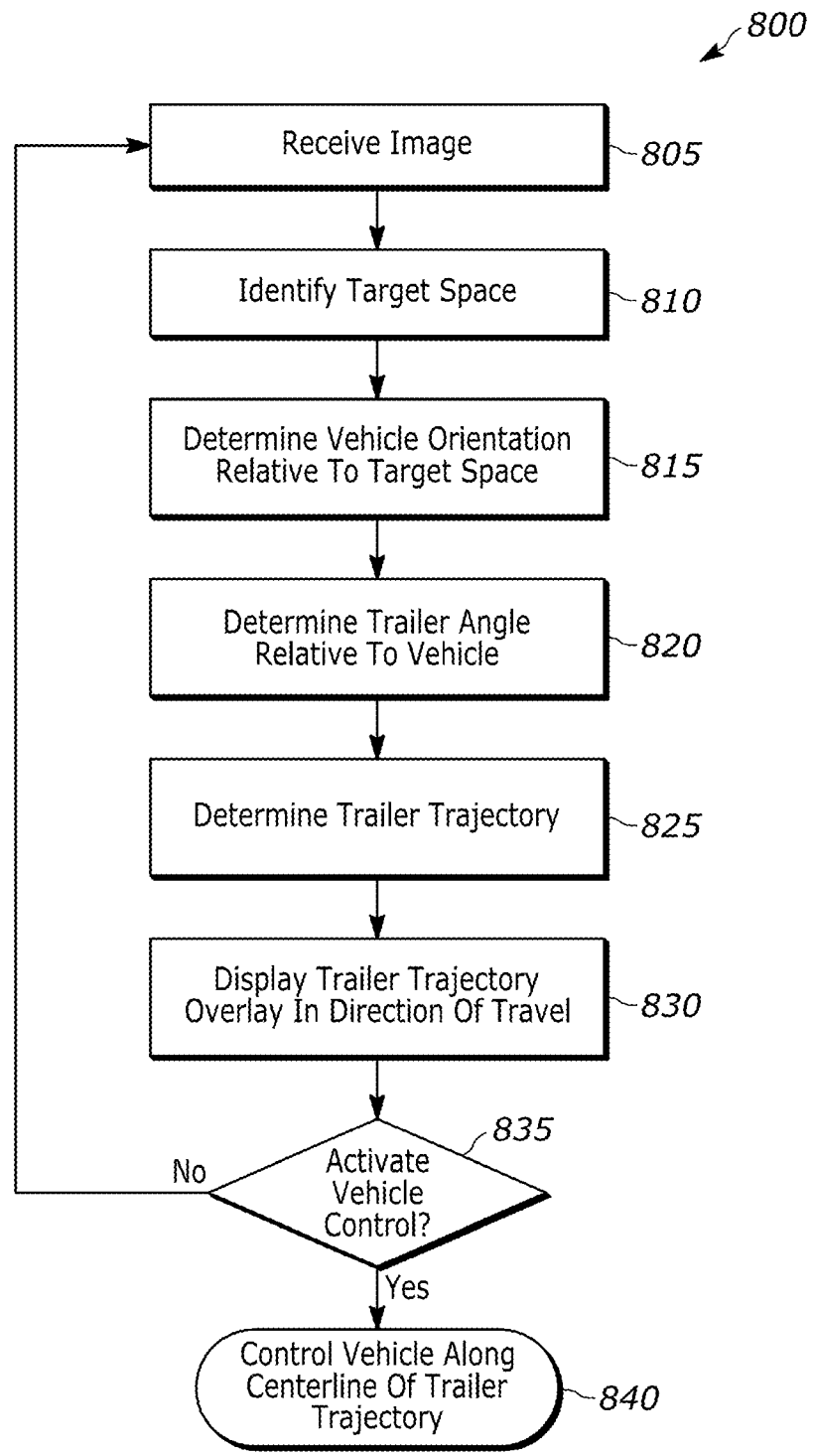
FIG. 7 illustrates a flow chart of a method for assisting in rearward maneuvering of a trailer attached to a vehicle according to one example.
Figure 8:
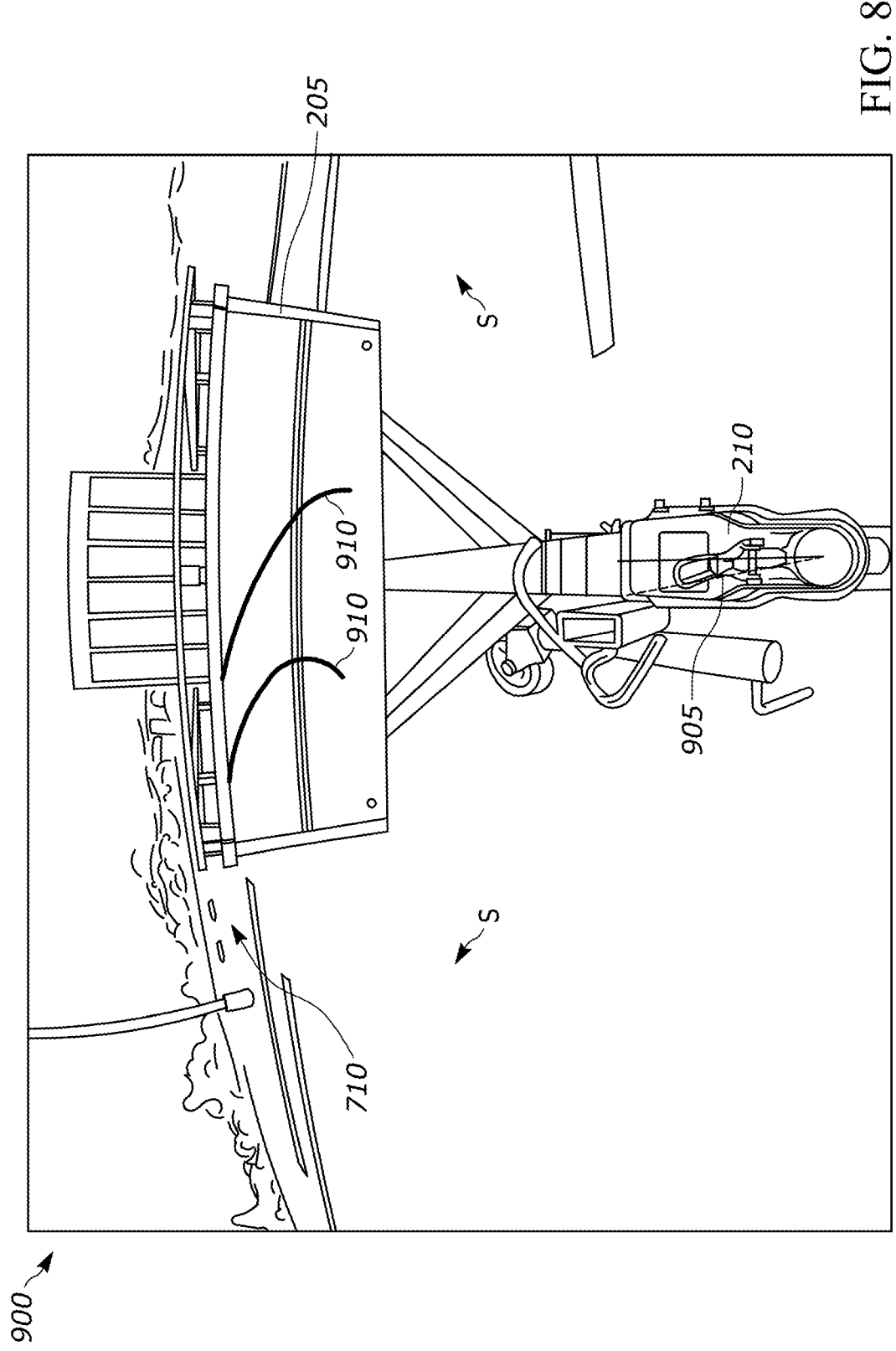
FIG. 8 illustrates an image captured by a camera that includes a trailer, surroundings of the trailer, a free-space, and that has been enhanced to depict a trailer trajectory.

FIG. 7 illustrates an example flow chart of method 800 for assisting in rearward maneuvering of the trailer 205. The method 800 begins at step 805 when the electronic processor 305 receives an image from the camera 405. For example, FIG. 8 shows an image 900 including the trailer 205 and the trailer's surroundings S. In some examples, the image 900 is captured by the camera 405 of the environment detection system 125. In other examples, the image 900 is captured by the camera 405 of the environment detection system 215. In some examples, the electronic processor 305 determines whether the trailer 205 is attached to the vehicle 105 based on the image 900. At step 810, the electronic processor 305 identifies the target-space 710 within the trailer's surroundings S based on the received image 900. In some instances, the electronic processor 305 determines a direction of the target-space 710 (e.g., the direction 705) relative to the vehicle 105 within the trailer's surroundings S. The direction 705 may include an orientation of the target-space 710, such as one or more curves of the target-space 710. The electronic processor 305 may identify the target-space 710 and the direction 705 based on image analysis software stored in the memory 310. In some instances, the image analysis software is a computer vision software or a deep learning software, or what is sometimes referred to as Computer Vision Driving Assistance (CVDA). In some examples, the electronic processor 305 identifies the target-space 710 from the ground level using semantic segmentation. In some examples, the electronic processor 305 determines one or more markings, one or more boundaries, or one or more objects within the target-space 710 based on the image 900.

At step 815, the electronic processor 305 determines a vehicle orientation relative to the target-space 710. For example, the electronic processor 305 determines the vehicle orientation based on the image 900. The vehicle orientation may be a position of the vehicle 105 or a direction of the vehicle 105 relative to the target-space 710. At step 820, the electronic processor 305 determines a trailer angle (for example, a trailer angle 905 shown in FIG. 8) relative to the vehicle 105 based on the vehicle orientation relative to the target-space 710. In some instances, the method 800 may include an additional step to determine the trailer angle 905 where a forward driving maneuver is performed. During the forward driving maneuver, the electronic processor 305 receives an image captured by the camera 405 and performs image analysis on the image to learn a trailer rotation point about the trailer hitch 210. Based on the trailer rotation point, the electronic processor 305 may calibrate the trailer rotation point to correspond to the trailer angle 905. In some examples, the electronic processor 305 determines the trailer angle 905 based on the image 900. The electronic processor 305 may determine a coordinate plane around the trailer hitch 210, using the image analysis software, that indicates a position of the trailer hitch 210 relative to the rear R. The coordinate plane may include a polar coordinate system or a radial coordinate system. The electronic processor 305 determines a change in the position of the trailer hitch 210 relative to the rear R within the coordinate plane as the trailer angle 905. For example, when the trailer hitch 210 is aligned with the rear R, the trailer angle 905 is approximately 0 degrees.

At step 825, the electronic processor 305 determines a trailer trajectory (for example, a trailer trajectory 910 shown in FIG. 8) based on the trailer angle 905. The trailer trajectory 910 is overlayed on the image 900 to illustrate a path from the trailer 205 to the target-space 710. In some instances, the trailer trajectory 910 includes a centerline. At step 830, the electronic processor 305 transmits the image 900 including an overlay of the trailer trajectory 910 in a direction of travel (e.g., the direction 705) toward the target-space 710 to the HMI 120. The HMI 120 displays the image 900 including the overlay of the trailer trajectory 910 on the display 510, such as image 530.

At step 835, the electronic processor 305 determines whether to activate a vehicle control (which may be implemented in whole or in part by the system 700 and other vehicle systems) to back up the trailer 205 along the trailer trajectory 910 to the target-space 710. In some examples, the electronic processor 305 activates the vehicle control in response to a user input via the input devices 540. When the electronic processor 305 determines not to activate the vehicle control, the method 800 returns to step 805 to receive a subsequent image from the camera 405. When the electronic processor 305 activates vehicle control, then the method 800 proceeds to step 840 and controls the vehicle 105 to follow the trailer trajectory 910 along a centerline of the trailer trajectory 910 until the trailer 205 reaches the target-space 710. The electronic processor 305 may continuously identify the direction 705 and the target-space 710 to update the trailer trajectory 910 during the vehicle control (e.g., to follow one or more curves of the target-space 710). The electronic processor 305 may continuously determine the vehicle orientation and the trailer angle 905 to follow the trailer trajectory 910 during the vehicle control. In some situations, the HMI 120 continuously displays the updated trailer trajectory 910 and the image 900 during the vehicle control. In some examples, the electronic processor 305 cancels the vehicle control when the trailer trajectory 910 cannot be achieved and the target-space 710 cannot be reached by the vehicle 105 and the trailer 205.

In some examples, the electronic processor 305 controls the steering control system 130 of the vehicle 105 to follow the trailer trajectory 910. The steering angle sensor 620 senses a first input steering angle (i.e., a first angle) of the steering wheel and transmits the first angle to the electronic processor 305. The electronic processor 305 determines a target vehicle yaw rate and a target trailer angle to achieve the trailer trajectory 910 based on the first angle. The electronic controller 305 communicates the target vehicle yaw rate and the target trailer angle 905 to the steering control system 130. The steering control system 130 applies the target vehicle yaw rate and the target trailer angle 905 to the vehicle control system 130 to follow the trailer trajectory 910, this may be done, for example, by changing the steering wheel angle of the vehicle 105. In some examples, the electronic processor 305 controls the steering control system 130 in a first mode to maintain the target vehicle yaw rate and the target trailer angle throughout the trailer trajectory 910. In other examples, the electronic processor 305 controls the steering control system 130 to maintain the first angle throughout the trailer trajectory 910.

In some examples, the electronic processor 305 controls the braking control system 135 of the vehicle 105 while controlling the vehicle 105 to follow the trailer trajectory 910. In some instances, braking is applied to the vehicle 105 when an object is determined to be in the path of the trailer trajectory 910 or in the target-space 710. The master cylinder pressure sensor 615 senses a first pressure differential of the braking control system 135 and transmits the first pressure differential to the electronic processor 305. The electronic processor 305 determines a second pressure differential based on the first pressure differential and the trailer trajectory 910. The electronic controller 305 communicates the second pressure differential to the braking control system 135. The braking control system 135 applies the second pressure differential to one or more wheels of the vehicle 105 via asymmetrical or symmetrical braking of the wheels of the vehicle 105.

In some examples, the electronic processor 305 controls the acceleration control system 140 to control or limit the speed of the vehicle 105 while controlling the vehicle 105 to follow the trailer trajectory 910. The vehicle speed sensor 625 senses a first speed of the vehicle 105 and transmits the first speed to the electronic processor 305. The electronic processor 305 determines a second speed (e.g., a target speed) based on the first speed and the trailer trajectory 910. The electronic processor 305 communicates the target speed to the acceleration control system 140 to control or limit the speed of the vehicle 105 while following the trailer trajectory 910.

Figure 9:
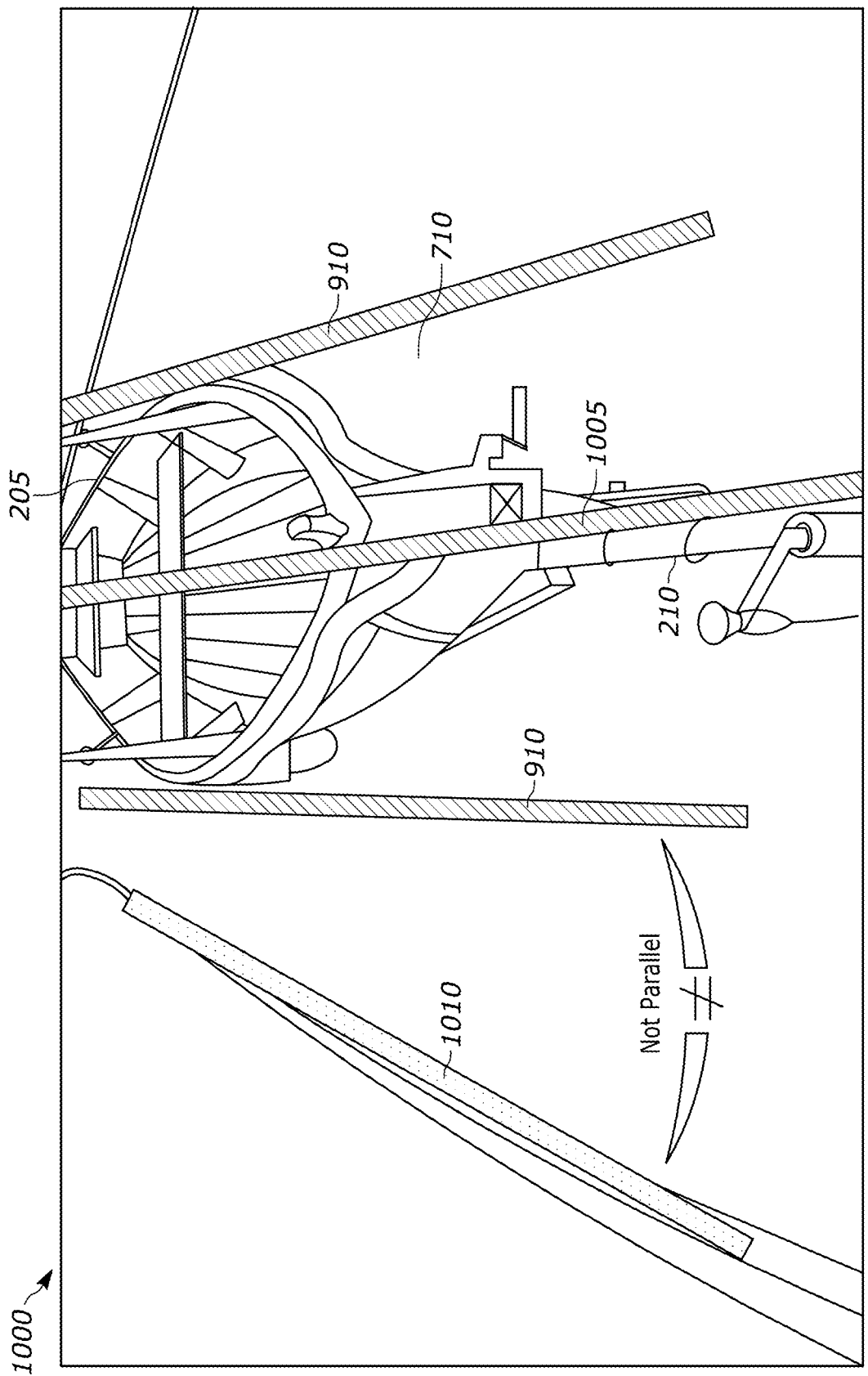
FIG. 9 illustrates an image captured by a camera that includes a trailer, a free-space, a trailer trajectory, and that has been enhanced to depict maintaining the trailer trajectory relative to a boundary.

When the system 100 is backing up the trailer 205 toward the target-space 710, the system 100 may operate in a first mode or a second mode. In some situations, the system 100 operates in the first mode to maintain the trailer trajectory 910 in a straight line while backing up the trailer 205. The user may want to maintain the current trailer trajectory while maneuvering the vehicle 105 to back up the trailer 205 to the target-space 710. The first mode of the system 100 may be activated by a first user input via the input devices 540. FIG. 9 illustrates model 1000 of the trailer 205 being backed up to the target-space 710 (FIG. 6) along a centerline 1005 of the trailer trajectory 910. In one example, the electronic processor 305 determines the centerline 1005 and the trailer trajectory 910. In some instances, it may be difficult for the user to determine when the trailer 205 is in the correct position to back up in a straight direction (e.g., a trailer angle of 0 degrees). A vanishing point in the model 1000 may make it difficult for the user to determine whether the trailer trajectory is parallel to a boundary 1010. In some examples, the electronic processor 305 determines the boundary 1010 based on the image 1000. Once the trailer 205 is positioned in a direction to back up in the desired trailer trajectory 910, the first mode of the system 100 is activated based on the first user input (e.g., a return to zero user input) via the input devices 540. In the first mode of the system 100, the electronic processor 305 determines the centerline 1005 of the trailer trajectory 910 to be the desired trailer trajectory to back up the trailer 205 to the target-space 710. In some situations, the centerline 1005 is parallel to the boundary 1010. The steering angle sensor 620 senses an input steering angle and transmits the input steering angle to the electronic processor 305. The electronic processor 305 determines a vehicle yaw rate based on the input steering angle. The electronic processor 305 communicates the vehicle yaw rate to the steering control system 130 to maintain the trailer angle 905 to back up the trailer 205 along the centerline 1005 in a straight direction. In other words, the electronic processor 305 adjusts the vehicle yaw rate based on the input steering angle to maintain the desired trailer trajectory 910 once the first mode of the system 100 is activated.

Figure 10A:
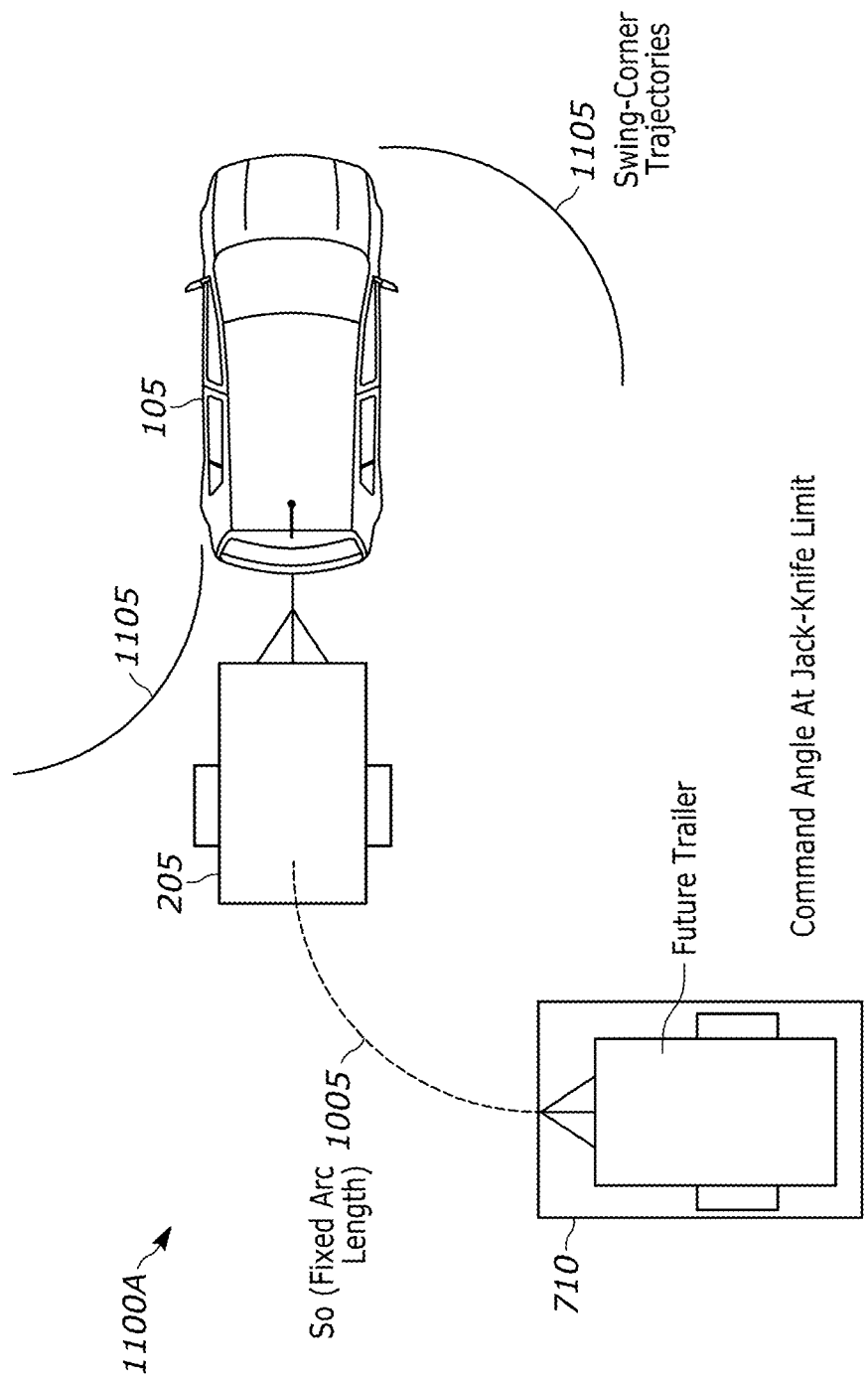
FIGS. 10A and 10B illustrate a model of the trailer tow assist system of FIG. 1 for assisting in rearward maneuvering of a trailer towards a free-space while maintaining a relative angle between the vehicle and the trailer.
Figure 10B:
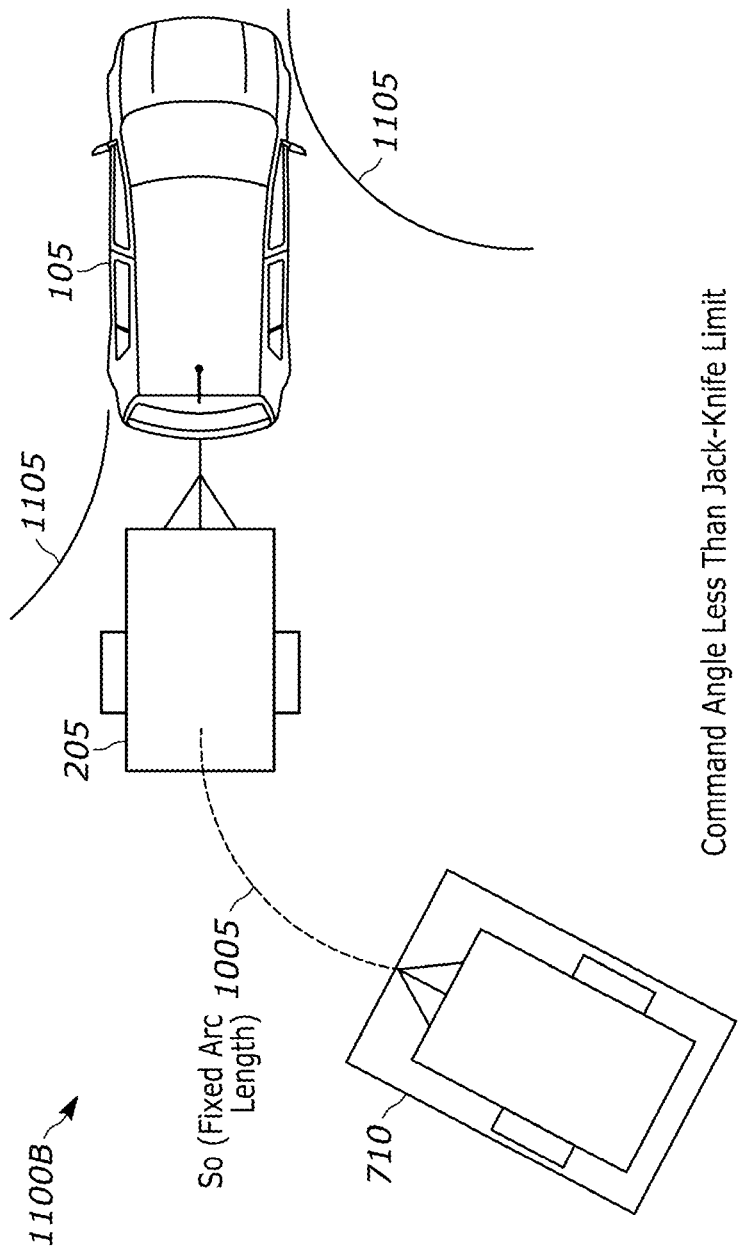

In some situations, the system 100 operates in the second mode to maintain a relative angle between the vehicle 105 and the trailer 205 while backing up the trailer 205. The user may want to maintain the relative angle while backing up the trailer 205 to the target-space 710, where the target-space 710 is perpendicular to the vehicle 105. FIGS. 10A and 10B illustrate models 1100A and 1100B illustrating backing up the trailer 205 to the target-space 710 (FIG. 6) along a centerline 1005 while maintaining a relative angle between the vehicle 105 and the trailer 205. In some instances, it may be difficult for the user to determine whether the trailer trajectory 910 will result in backing the trailer 205 to the target-space 710 based on geometric parameters of the vehicle 105, geometric parameters of the trailer 205, and objects within the trailer trajectory 910. The second mode of the system 100 may be activated based on a second user input via the input devices 540. In the second mode of the system 100, the steering angle sensor 620 senses the first input steering angle (e.g., the first angle) of the steering wheel and transmits the first angle to the electronic processor 305. The first angle corresponds to a relative trailer angle between the vehicle 105 and the trailer 205. The electronic processor 305 determines a target vehicle yaw rate to maintain the relative trailer angle and follow the trailer trajectory 910. The electronic processor 305 communicates the target vehicle yaw rate to the steering control system 130. The steering control system 130 applies the target vehicle yaw rate to the vehicle control system 130 to maintain the relative trailer angle at a fixed arc length to follow the trailer trajectory 910. Additionally, the electronic processor 305 transmits an image, received from the camera 405, including the vehicle and trailer's surroundings S to the HMI 120 to display via the display 510. The electronic processor 305 determines an overlay of the trailer trajectory 910 and communicates the overlay to the HMI 120 to display on the image. The overlay of the trailer trajectory 910 shows a future outline of the trailer 205 based on the relative trailer angle and the fixed arc length. Although illustrated from above in models 1100A and 1100B, the future outline and the trailer trajectory 910 may be shown in the image on the display 510 at a ground level within the target-space 710. The overlay includes swing corner trajectories 1105 of the vehicle 105 and the trailer 205 based on the target vehicle yaw rate to maintain the relative trailer angle. The model 1100A shows a maximum fixed arc length at which the vehicle 105 and the trailer 205 would jackknife based on geometric parameters of the vehicle 105 and the trailer 205. The model 1100B shows the fixed arc length less than the maximum fixed arc length at which the vehicle 105 and the trailer 205 would not jackknife. When the electronic processor 305 detects a jackknife condition between the vehicle 105 and the trailer 205, the electronic processor 305 communicates a braking command to the braking control system 135. In response to the braking command, the braking control system 135 supplies an additional pressure differential to one or more wheels of the vehicle 105 via asymmetrical or symmetrical braking of the wheels of the vehicle 105 to mitigate the jackknife condition.

Figure 11:
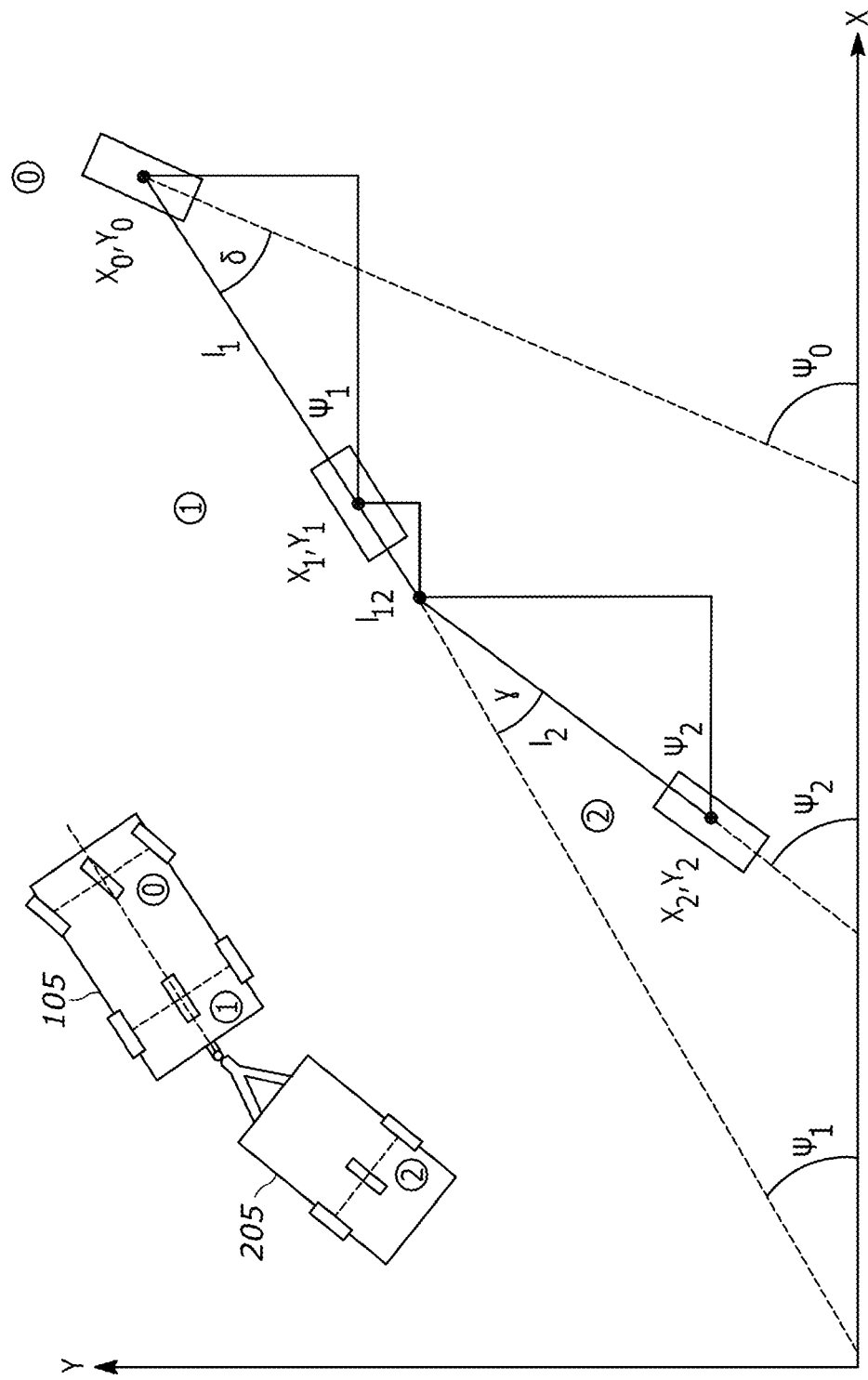
FIG. 11 illustrates a model of a vehicle and a trailer and geometric relationships used to determine a trailer angle with respect to the vehicle according to one example.

FIG. 11 illustrates a model of the vehicle 105 and the trailer 205 and geometric relationships used to determine the trailer angle 905 with respect to the vehicle 105. FIG. 11 also illustrates one example of angles for determining various values for algorithms executed in the first mode of the system 100 and the second mode of the system 100 relative to an X-Y axis. In one example, the trailer angle 905 ($\gamma$) is determined based on a vehicle speed v, a steering angle $\delta$, a vehicle overhang $l_{12}$ (a distance from a rear axle of the vehicle 105 to a trailer ball of the trailer hitch 120), a vehicle wheelbase $l_1$, and a trailer length $l_2$ (a distance from the trailer hitch 120 to a trailer axle). The vehicle yaw rate may be determined based on the steering angle $\delta$, the vehicle wheelbase $l_1$ and the vehicle speed v. In some examples, the trailer length $l_2$ is estimated by the electronic processor 305 via the image analysis software. The electronic processor 305 estimates the dynamics of trailer motion based on an image provided by the camera 405.

Thus, examples provide, among other things, a trailer tow assist system for assisting in rearward maneuvering of a trailer. Various features, advantages, and examples are set forth in the following claims.

What is claimed is:

1. A trailer tow assist system for assisting in rearward maneuvering of a trailer attached to a vehicle, the trailer tow assist system comprising:
    a camera configured to capture a rearward image of the trailer and its surroundings;
    a human machine interface configured to display the rearward image,
    an input device configured to receive user input; and
    an electronic processor configured to:
        receive the rearward image;
        identify, based on the rearward image, a target-space within the surroundings, the target-space being a subset of the surroundings shown in the rearward image;
        determine, based on the rearward image, a vehicle orientation relative to the target-space;
        determine, based on the rearward image, a trailer angle relative to the vehicle;
        determine, based on the trailer angle, a trailer trajectory within the surroundings;
        display the trailer trajectory and rearward image on the human machine interface; and
        control, in response to the user input, the vehicle to follow the trailer trajectory along a centerline of the trailer trajectory.

2. The trailer tow assist system of claim 1, wherein the electronic processor is further configured to:
    determine an object within the target-space to avoid.

3. The trailer tow assist system of claim 1, wherein the electronic processor is further configured to:
    determine a boundary based on the target-space.

4. The trailer tow assist system of claim 1, further comprising:
    a steering angle sensor configured to sense a first angle of a steering wheel of the vehicle;
    a steering control system;
    the electronic processor is further configured to:
        determine a second angle based on the trailer trajectory and the first angle; and
        control the steering control system to follow the trailer trajectory based on the second angle.

5. The trailer tow assist system of claim 1, wherein the electronic processor is further configured to:
    control the steering control system in a first mode and in a second mode.

6. The trailer tow assist system of claim 5, wherein during the first mode, the electronic processor is further configured to:
    control the steering control system to maintain the trailer trajectory in a straight line while backing up.

7. The trailer tow assist system of claim 6, wherein during the second mode, the electronic processor is further configured to:
    control the steering control system to maintain a relative angle between the vehicle and the trailer while backing up.

8. The trailer tow assist system of claim 1, further comprising:
    a braking control system;
    a master cylinder pressure sensor configured to sense a first pressure differential of the braking control system;
    the electronic processor is further configured to:
        determine a second pressure differential based on the trailer trajectory and the first pressure differential; and
        control the braking control system to apply the second pressure differential.

9. The trailer tow assist system of claim 1, further comprising:
    an acceleration control system;
    a vehicle speed sensor configured to sense a first speed of the vehicle;
    the electronic processor further configured to:
        determine a second speed based on the trailer trajectory and the first speed; and
        control the vehicle acceleration system based on the second speed.

10. A method for assisting in rearward maneuvering of a trailer attached to a vehicle with a trailer tow assist system including an electronic processor comprising:
    receiving, via a camera, a rearward image of the trailer and its surroundings;
    identifying, based on the rearward image, a target-space within the surroundings, the target-space being a subset of the surroundings shown in the rearward image;
    determining, based on the rearward image, a vehicle orientation relative to the target-space;
    determining, based on the rearward image, a trailer angle relative to the vehicle;

determining, based on the trailer angle, a trailer trajectory within the surroundings;

displaying the trailer trajectory and the rearward image on a human machine interface; and controlling, in response to a user input, the vehicle to follow the trailer trajectory along a centerline of the trailer trajectory.

11. The method of claim 10, wherein the method further comprises:

determining an object within the target-space to avoid.

12. The method of claim 10, wherein the method further comprises:

determining a boundary based on the target-space.

13. The method of claim 10, wherein the method further comprises:

sensing, via a steering angle sensor, a first angle of a steering wheel of the vehicle;

determining, via the electronic processor, a second angle based on the trailer trajectory and the first angle; and controlling a steering control system to follow the trailer trajectory based on the second angle.

14. The method of claim 10, wherein the method further comprises:

controlling the steering control system in a first mode and controlling the steering control system in a second mode.

15. The method of claim 14, wherein during the first mode, the method further comprises:

controlling the steering control system to maintain the trailer trajectory in a straight line while backing up.

16. The method of claim 15, wherein during the second mode, the method further comprises:

controlling the steering control system to maintain a relative angle between the vehicle and the trailer while backing up.

17. The method of claim 10, wherein the method further comprises:

sensing, via a master cylinder pressure sensor, a first pressure differential of a braking control system;

determining, via the electronic processor, a second pressure differential based on the trailer trajectory and the first pressure differential; and controlling the braking control system to apply the second pressure differential.

18. The method of claim 10, wherein the method further comprises:

sensing, via a vehicle speed sensor, a first speed of the vehicle;

determining, via the electronic processor, a second speed based on the trailer trajectory and the first speed; and controlling a vehicle acceleration system based on the second speed.

19. The method of claim 1, wherein the electronic processor, is further configured to receive a user input indicating whether the controller should control the steering control system in the first mode or the second mode.

20. The method of claim 14, wherein the method further comprises receiving, via the electronic processor, a user input indicating whether the controller should control the steering control system in the first mode or the second mode.

* * * * *